UNITED STATES PATENT OFFICE.

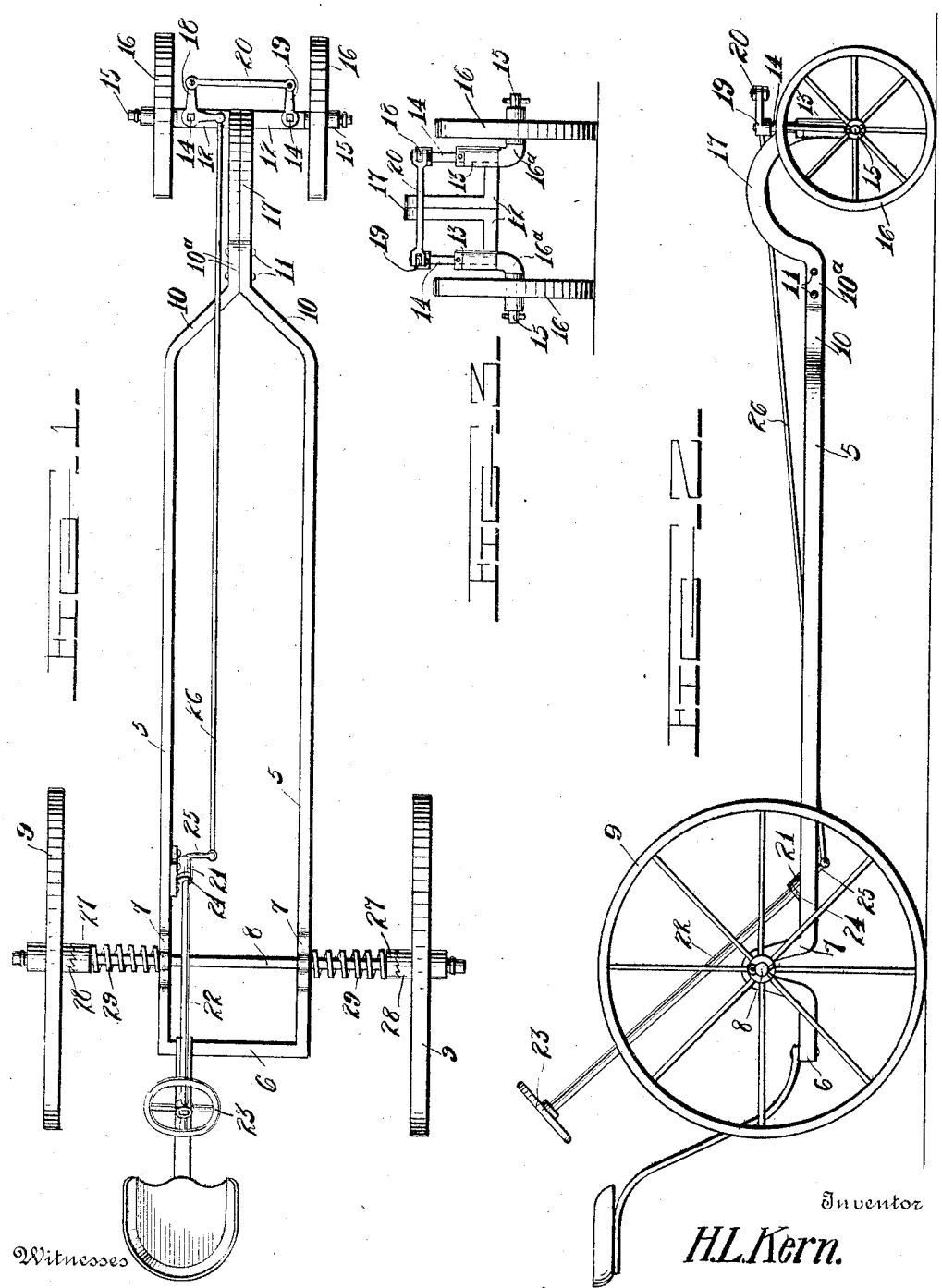

HENRY L. KERN, OF KENSINGTON, KANSAS.

FRAME AND STEERING MECHANISM FOR GRAIN-DRILLS.

1,016,225. Specification of Letters Patent. Patented Jan. 30, 1912.

Original application filed February 6, 1911, Serial No. 606,883. Divided and this application filed April 20, 1911. Serial No. 622,285.

*To all whom it may concern:*

Be it known that I, HENRY L. KERN, a citizen of the United States, residing at Kensington, in the county of Smith, State of Kansas, have invented certain new and useful Improvements in Frame and Steering Mechanism for Grain-Drills; and I do hereby declare the following to be a full, clear, and exact description of the invention, such as will enable others skilled in the art to which it appertains to make and use the same.

This invention relates to an improved frame construction and steering means especially adapted for use in connection with seeding drills and forms a division of my pending application filed Feb. 6, 1911; Serial #606,883.

The principal object of the invention is to provide a frame construction which will permit of the front wheels turning thereunder.

Another object of the invention is to provide a means controlled by the operator for simultaneously turning both of said front wheels.

A further object of the invention is to provide a structure for the purpose described which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Figure 1 is a top plan view showing the frame and the steering mechanism for the front wheels. Fig. 2 is a side elevation thereof, and Fig. 3 is a detail front elevation of the implement.

Like reference numerals designate corresponding parts in all the figures of the drawing.

Referring to the drawings, my invention comprises a frame formed from a single piece of metal, and bent centrally to form spaced longitudinal sills 5—5 and a rear end 6, the sills near their rear ends being upwardly arched, as indicated by 7—7, to form a support for a rear axle 8, having suitable driving wheels 9—9 loosely mounted thereon. The front portions of the sills 5 converge inwardly, as indicated at 10—10, and have their extremities 10$^a$ and 10$^a$ disposed in engagement and secured by means of rivets 11, or other suitable fastening means. The extreme ends of the frame are laterally bent in opposite directions to form supports 12—12. Disposed at either end of the supports 12, and preferably formed integral therewith, are upwardly extending socket members 13—13 for receiving spindles 14—14. The lower ends of the spindles are bent at right angles to form axles 15—15, for supporting ground wheels 16—16. The spindles 14 are furthermore provided below the sockets 13 with enlarged portions 16$^a$—16$^a$, which form bearings for the said frame, as will be readily understood. The diameter of the wheels 16 is considerably less than the diameter of the wheels 9, and by reason of the arches 7—7 formed by the frame for the rear wheels, the said frame is thereby disposed in a substantially horizontal plane. The extremities 10$^a$ of the frame are bent upwardly to form an arch 17 for permitting either of the front wheels 16 passing thereunder.

Fixedly secured to the upper end of one of the spindles 14 is a horizontally disposed bell-crank lever 18. Fixedly secured to the other spindle 14, and disposed in horizontal relation, is a short lever 19. A link 20 is pivotally connected at its ends to one arm of the bell-crank lever 18 and to the free end of the short lever 19. Disposed within the frame, and secured to one of the sills 5 thereof near the rear end, is an inclined bearing box 21. Rotatably mounted within the said box 21 is a shaft 22, having at its upper end a steering wheel 23. A collar 24 is secured to the shaft above the bearing box, for limiting the downward movement of said shaft. The lower or free end of the shaft is bent at right angles to form a crank-arm 25. Pivotally connected to the free end of the crank-arm 25, and to the free end of the other arm of the bell-crank lever 18, is a link rod 26. Thus it will be seen that upon rotating the shaft 22 by means of the wheel 23, the crank-arm 25 will, through the link rod 26, actuate the bell-crank lever 18, which latter, through the medium of the link 20 and short arm 19, will turn the ground wheels 16 in either direction.

Ratchets 27—27 are suitably mounted upon the rear axle 8 and engage the toothed hubs 28—28 of the wheels 9, and coil springs 29—29 are disposed around the axle 28 between the ratchet elements 27 and the sills 5 of the frame. These springs bear against the elements 27 for normally keeping the same in engagement with the toothed hubs 28. Thus it will be observed that when the front wheels 16 are turned, either of the rear wheels 9, depending upon the direction the implement is turned, will be permitted to remain substantially stationary to revolve around on its vertical axis, and thereby permit the implement to be turned within a comparatively short space.

What is claimed is:

1. In a machine of the class described, a frame formed from a single piece of metal and bent centrally to form spaced longitudinal sills and a rear end, the sills near their rear ends being upwardly arched, a wheeled axle connected to said arches, the front portions of the sills converging inwardly and having their extremities disposed in engagement and arched and secured together, the extreme ends of the sills being bent in opposite directions to form supports, axles respectively connected to each support, and ground wheels mounted upon said axles.

2. In a machine of the class described, a frame formed from a single piece of metal and bent centrally to form spaced longitudinal sills and a rear end, the sills near their rear ends being upwardly arched, a wheeled axle connected to said arches, the front portions of the sills converging inwardly and having their extremities disposed in engagement and arched and secured together, the extreme ends of the sills being bent in opposite directions to form supports, upwardly extending socket members integral with the supports, spindles mounted within the sockets and provided at their lower ends with laterally extending axles, and ground wheels mounted upon said axles.

In testimony whereof, I affix my signature in presence of two witnesses.

HENRY L. KERN.

Witnesses:
 L. C. AHLBORN,
 R. G. AHLBORN.

Copies of this patent may be obtained for five cents each, by addressing the "Commissioner of Patents, Washington, D. C."